United States Patent Office 3,423,238
Patented Jan. 21, 1969

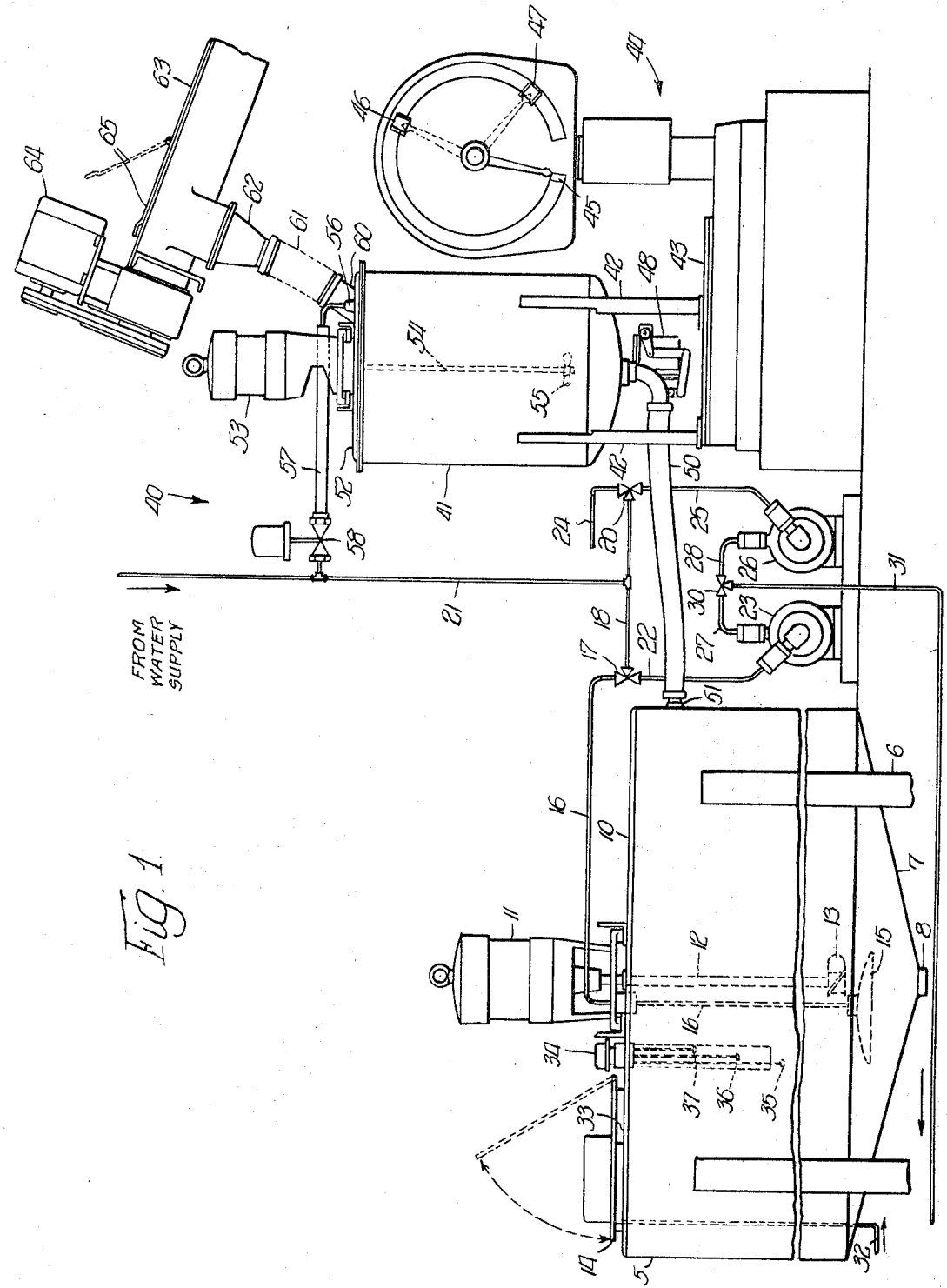

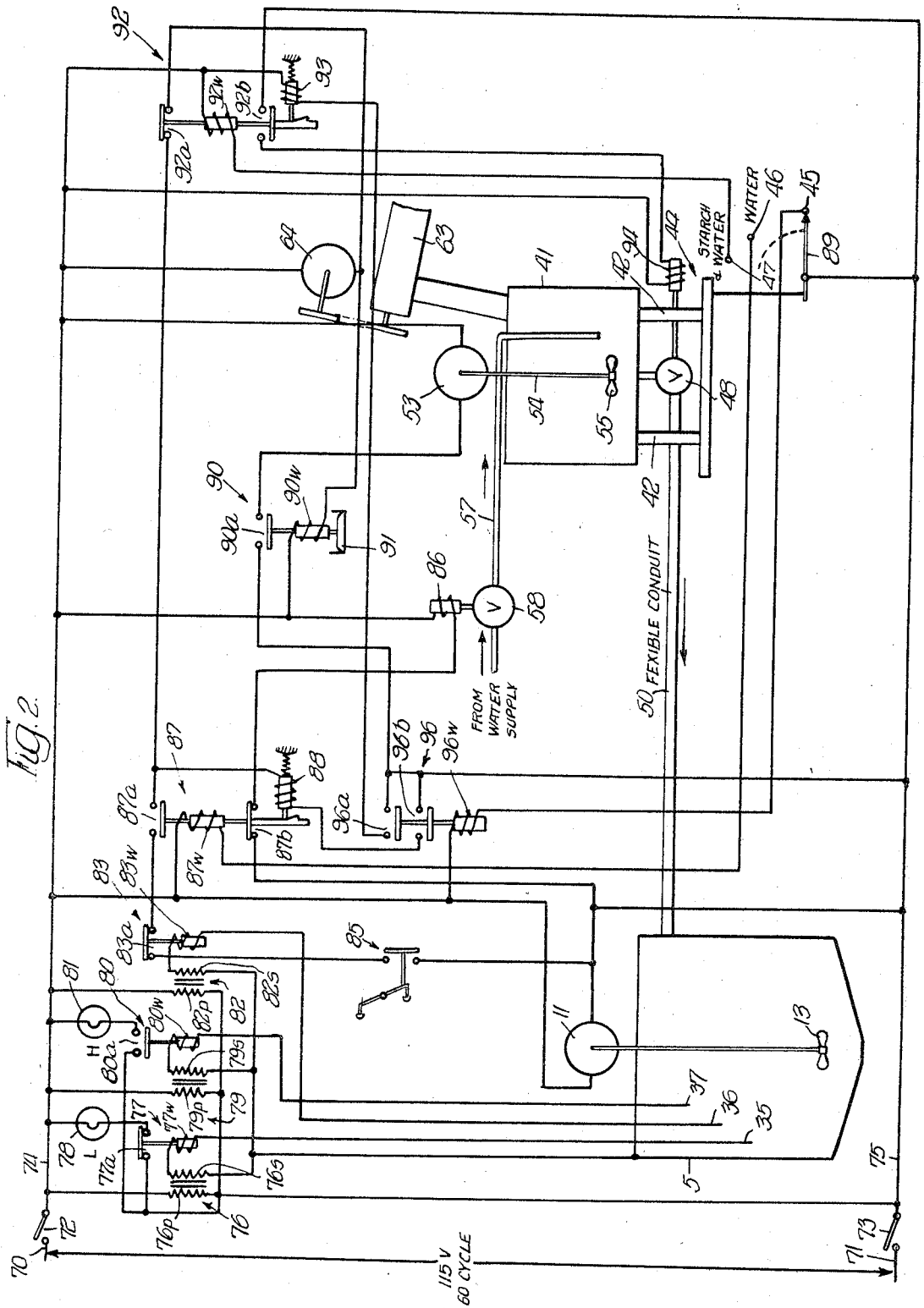

3,423,238
SLURRY MAKE-UP SYSTEM
Edward Weiland, Decatur, Ill., assignor to A. E. Staley Manufacturing Company, Decatur, Ill., a corporation of Delaware
Filed Jan. 17, 1966, Ser. No. 521,149
U.S. Cl. 127—28        8 Claims
Int. Cl. C13l 1/00; B28c 5/40

This invention relates to improvements and innovations in methods and apparatus for preparing and maintaining relatively large supply volumes of slurries or dispersions of solids in liquids, and particularly slurries of starch in water.

Starch is widely used in large quantities for various industrial purposes. For example, large quantities of starch are utilized in the paper and textile industries. In many instances it is desirable to prepare and maintain a relatively large supply of a starch slurry made up to a predetermined starch solids content. By maintaining the supply under adequate agitation, the slurry will be readily available as required for plant use.

Various arrangements and systems have previously been used for slurrying starch so that it can be utilized in the slurry form. For example, in Etheridge Patent No. 2,871,146 there is disclosed a starch slurry make-up tank which is used to supply a special starch pasting system. The starch slurry make-up tank is provided with a mounted agitator, a trip-type water meter for introducing predetermined increments of water and a slurry withdrawal connection and return. Bags of starch are added to the tank. Thus, the starch slurry supply tank is manually filled and maintained in this patent.

The object of the present invention is to provide a starch slurry make-up system which is automatic in operation and is characterized by its simplicity, accuracy and reliability of performance, and its low cost, particularly when compared with relatively sophisticated continuous density controllers of known type.

Certain other objects of the invention will be obvious and appear hereinafter.

For a complete understanding of the nature and scope of the invention, reference may now be had to the following detailed description thereof taken in connection with the accompanying drawings wherein:

FIG. 1 is a semi-diagrammatic view of a starch slurry make-up apparatus or installation constituting a preferred embodiment of the invention, and one in which the method aspects of the invention may be readily practiced; and FIG. 2 is an electrical wiring diagram for the apparatus shown in FIG. 1.

Referring now to FIG. 1, a relatively large starch slurry supply tank is indicated at 5. For example, this tank may be large enough to hold 1,000 gallons of starch slurry, which capacity will be provided by a tank which is approximately 6 feet in diameter and 6 feet in vertical height. The tank 5 may be supported in known manner on a plurality of legs 6 and preferably has a conical bottom 7 provided with a valved drain or discharge opening 8.

The cover 10 of the tank 5 centrally supports an electric motor 11 which serves to drive a shaft 12 which projects down into the tank and carries on its lower end an agitator or impeller wheel 13. The cover 10 is provided with a covered manhole 14, the cover of which may be raised so as to gain access to the interior of the tank for repairs or cleaning purposes. Also, the tank 5 may be manually bag filled through the manhole 14 in the event the automatic starch slurry make-up system is not operating for some reason.

A vertically adjustable starch slurry in-take strainer 15 is disposed within the central portion of the tank and is carried on the lower end of a pipe or conduit 16. The conduit 16 leads out of the tank to a T-fitting 17 having a lateral connection 18 leading to another T-fitting 20. A water supply line 21 leads down and connects with the center portion of the line 18.

The T-fitting 17 also has a third line 22 connected therewith which leads to one connection or port of a circulating pump 23. The T-fitting 20 has one line 24 connected at the top and a third line 25 connected at the bottom which leads to the one of the connections of a second circulating pump 26. Additional connections or ports of the pumps 23 and 26 are interconnected by lines 27 and 28, respectively, to the in-line connections of a T-fitting 30. The third connection of fitting 30 is connected with a discharge line 31 for discharging starch slurry to a starch cooker (not shown) and thence to a piece of process equipment (not shown) e.g. the size press of a paper machine. Excess starch slurry may be returned from the equipment through return line 32 which discharges back into the tank 5 through a connection 33 in the top 10 to maintain required dispersion.

The tank 5 is provided with a liquid level senser and controller of known type, which is indicated generally at 34. The unit 34 is mounted on the tank cover and projects downwardly into the tank. This particular unit 34 has three electrodes or probes, the lowermost being indicated at 35, the middle electrode or probe being indicated at 36, and the upper electrode at 37. Liquid level sensers and controllers of this type are commercially available from several sources, a suitable one being available from C. F. Warrick Co., Model No. E3, Three Electrode Fitting—2" N. P. T. When suitably interconnected in an electrical system, the controller 34 will operate in such a way, as described hereinafter, that when the level of the slurry in the tank 5 drops below the level of the middle probe 36, the starch make-up system indicated generally at 40 will cycle to mix and add one or more increments of starch slurry to the tank 5 until the electrode 36 is again immersed or covered. The lower electrode 35 serves to indicate (i.e. signal or sound) a low level alarm and/or shut off the complete system should the starch slurry fall below this electrode. Similarly, the upper electrode 37 serves to indicate a high level alarm and/or shut off the entire system should the level of the slurry rise to immerse this electrode.

The starch slurry make-up system 40 comprises a wetting tank 41 which is relatively small in comparison with the main starch slurry supply tank 5. For example, the tank 41 may have a 60 gallon capacity. The tank 41 is supported by legs 42—42 on the platform 43 of a scale of known type, indicated at 44. The dial of the scale 44 is provided with a fixed zero electrical contact 45 and with two adjustably positionable contacts 46 and 47, for purposes to be presently described.

The bottom of the tank 41 is provided with a solenoid controlled flush valve of known type indicated at 48, the discharge opening of which is connected by a flexible hose 50 to an inlet connection 51 in the upper portion of the tank 5.

The cover 52 for the tank 41 supports an electric motor 53 which serves to drive an agitator shaft 54 projecting downwardly into the container 41 and supporting on the lower end thereof a mixing blade or impeller 55. Water is delivered into the tank 41 through a connection 56 in the cover 52 which is supplied with water through a flexible hose 57 leading from a solenoid controlled valve 58 of known type. The inlet connection of the valve 58 is joined to the water supply line 21. A separate water connection to a spray nozzle within the tank can be used to wash down wetted starch dust accumulation.

Starch is delivered into the tank 41 through a connection 60 in the cover 52 which is joined by a flexible connection 61 to the discharge connection 62 on the underside of the upper end of a screw conveyor 63. The conveyor 63 is driven by an electric motor 64 through a gear box in known manner. For cleaning and access purposes, the top of the screw conveyor housing 63 is provided with a door or cover 65.

FIG. 2 shows the circuit connections that can be employed in connection with the slurry make-up system described hereinbefore. Electrical power for operating the system can be supplied from conductors 70 and 71 that are energized from a suitable source, such as 115 volt, 60 cycle alternating current source. The conductors 70 and 71 are arranged to be connected by line switches 72 and 73 to energize conductors 74 and 75.

Associated with the lowermost electrode or probe 35 is a transformer, shown generally at 76, having a primary winding 76p that is connected for energization between the conductors 74 and 75. The transformer 76 includes a secondary winding 76s for energizing operating winding 77w of a relay 77 having normally closed contacts 77a. Usually the level of the liquid in tank 5 is above the lower end of the electrode or probe 35 and winding 77w is energized to hold contacts 77a open. When the liquid level falls below the electrode or probe 35, the energizing circuit for winding 77w is opened, contacts 77a close and a signal light 78 is energized to indicate the low liquid level condition in the tank 5.

A similar circuit arrangement is associated with upper electrode or probe 37. It includes a transformer, shown generally at 79, having a primary winding 79p connected for energization between conductors 74 and 75. Also it includes a secondary winding 79s for energizing an operating winding 80w of a relay 80 having normally open contacts 80a. When the level of the liquid in tank 5 rises to complete the circuit between the upper electrode or probe 37 and the tank 5, winding 80w is energized and its contacts 80a are closed to complete a circuit for energizing signal lamp 81, thereby indicating that the liquid level has reached a predetermined height in the tank 5.

Associated with the middle electrode or probe 36 is a transformer 82 having a primary winding 82p that is connected for energization between conductors 74 and 75. Also it includes a secondary winding 82s for energizing operating winding 83w of a relay 83 having normally closed contacts 83a. Whenever the level of the liquid in tank 5 remains below the lower end of the middle electrode or probe 36, the energizing circuit for operating winding 83w is open and contacts 83a remain closed.

In the circuit shown in FIG. 2, on closure of line switches 72 and 73, motor 11 is energized since it is connected directly between conductors 74 and 75. In addition, at the same time, the motors (not shown) for operating the circulating pumps 23 and 26 are energized.

In order to effect continued recycling of the control system there is provided a manual control switch 85. In addition to closing line switches 72 and 73, the control switch 85 is operated to close its contacts.

A further result of the closure of line switches 72 and 73 is to complete an energizing circuit for solenoid or winding 86 of the solenoid controlled valve 58. This circuit is completed through normally closed contacts 87b of a water level control latch relay shown generally at 87. This relay includes an operating winding 87w and normally open contacts 87a. A latch release winding 88 also is a part of this relay.

The flow of water continues to wetting tank 41 until a predetermined quantity of water has been delivered to it as measured by the scale 44. This is reflected by movement of scale pointer 89 to engage water level contact 46 where a circuit is completed for energizing operating winding 87w of the water level control latch relay 87.

As a result, contacts 87a are closed while contacts 87b are opened to de-energize the solenoid or winding 86 for the valve 58 which closes and shuts off further supply of water to the wetting tank 41.

Assuming now that the manual control switch 85 is still in the closed position and contacts 83a of relay 83 are closed due to the level of the liquid in tank 5 being below the lower end of the middle electrode or probe 36, a circuit is completed on closure of contacts 87a for energizing motor 64 to operate the starch conveyor 63. This supplies starch to the wetting tank 41. Energized in parallel with the motor 64 is a winding 90w of a motor control relay 90 which has normally open contacts 90a. On closure of contacts 90a, motor 53 is energized for rotating the mixing blade or impeller 55 in the wetting tank 41. Associated with the motor control relay 90 is a dashpot 91 which, while not interfering with the closure of contacts 90a, serves to hold them closed for a predetermined time after de-energization of winding 90w.

The circuit for energizing the motor 64 and winding 90w is completed through normally closed contacts 92a of a starch and water level control relay that is shown, generally, at 92. This relay also includes normally open contacts 92b and an operating winding 92w. A latch release winding 93 also forms a part of the relay 92.

On energization of the winding 87w of the relay 87, this relay is latched in the operated condition so that, when the scale pointer 89 moves out of engagement with contact 46, contacts 87a remain closed and contacts 87b remain open. After winding 92w of relay 92 is energized, contacts 92a remain open and contacts 92b remain closed since they are mechanically held by the latch in these positions.

The addition of starch by the conveyor 63 to the wetting tank 41 increases the weight applied to the scale 44 and finally moves the scale pointer 89 into engagement with contact 47 to complete an energizing circuit for operating winding 92w of the relay 92. Contacts 92a opened and motor 64 is de-energized along with de-energization of winding 90w of relay 90. However, motor 53 continues to run for a time determined by the dashpot 91 until contacts 90a are opened.

A further result of the operation of relay 92 is to close contacts 92b for energizing a winding 94 for opening dump valve 48 to permit the contents of the wetting tank 41 to flow into the tank 5.

As the result of the discharge of the contents of the wetting tank 41, the scale pointer 89 returns to the zero position and in engagement with zero contact 45. This completes an energizing circuit for the winding 96w of a reset relay that is shown, generally, at 96 and includes normally open contacts 96a and 96b. On closure of these contacts the latch release windings 93 and 88, respectively, are energized for the purpose of unlatching the relays 92 and 87.

Closure of contacts 87b again completes the energizing circuit for the solenoid or winding 86 for the valve 58 and the cycle is again commenced and continues until the scale pointer 89 engages contact 46 to energize relay 87. The flow of water to the wetting tank 41 then is shut off. The cycle continues provided that the level of the liquid in tank 5 is below the middle electrode or probe 36, thereby permitting contacts 83a to close and complete the circuit previously described for energizing motor 64 to supply starch to the wetting tank 41 and for energizing the motor control relay 90 to start the motor 53.

If it is desired to supply a slurry from the wetting tank 41 to the tank 5 containing three pounds of starch per gallon, an increment of 370 pounds of water (46.4) gallons and 200 pounds of starch is required. Accordingly, the position of the contact 47 is adjusted at a point corresponding to an addition of 570 pounds net weight to the scale 44. Under these circumstances the contact 46 is adjusted to such position as to operate relay 87 when 370 pounds of water have been added to the wetting tank 41. It will be understood that the contacts 46 and 47 can be appropriately positioned for other desired starch solids concentrations.

As indicated above, it is preferred to terminate the cycle (when the relatively large hold tank is satisfied) afer the addition of liquid to the wetting tank. This serves two purposes when employing starch. The addition of water serves to wet down starch dust on the walls of the small container and prevents the formation of a starch gel at the bottom of the small container. The formation of a starch gel at the bottom of the small container is particularly undesirable since it may prevent dump valve 48 from opening or the gel may partially clog the valve, necessitating frequent cleaning of the small container.

However, if desired, the apparatus and process of this invention may be modified in such manner that the cycle is terminated (when the relatively large hold tank is satisfied) immediately after dump valve 48 is closed. One cycle of the process would then comprise creating a first electrical response when the large supply falls below a predetermined level in the relatively large container, utilizing said first response to activate means for feeding a predetermined relatively small increment of liquid into the relatively small container; creating a second electrical response when said predetermined increment of liquid has been completely introduced into said relatively small container, utilizing said second electrical response to both deactivate said electrical feeding means and to activate means for feeding a predetermined relatively small increment of solid ingredient into said relatively small container, creating a third electrical response when said predetermined increment of said solid material has been fed, utilizing said third electrical response to both deactivate said solid feeding means and to activate means for discharging said combined relatively small liquid and solid increments into said relatively large slurry supply, creating a fourth electrical response once said discharging is completed, utilizing said fourth response to close said discharging means.

Since many embodiments may be made of this invention and since many changes may be made in the embodiments described, the foregoing is to be interpreted as illustrative only, and the invention is defined by the claims appended hereto.

What is claimed as new is:

1. A cyclic method of automatically maintaining in a relatively large container a relatively large supply of a slurry of predetermined composition containing a liquid component and a solid ingredient, one cycle of which comprises, creating a first electrical response when said large supply falls below a predetermined level in said relatively large container, utilizing said first response to activate means for feeding a predetermined relatively small increment of said solid ingredient into a predetermined relatively small increment of said liquid component in a relatively small container, creating a second electrical response when said predetermined increment of said solid material has been fed, utilizing said second electrical response to both deactivate said solids feeding means and to activate means for discharging said combined relatively small liquid and solid increments into said relatively large slurry supply, creating a third electrical response when said discharging is complete, utilizing said third response to both close said discharging means and activate means for feeding the next of said predetermined relatively small increments of said liquid into said relatively small container, creating a fourth electrical response when said next increment of liquid is completely introduced into said relatively small container, and utilizing said fourth electrical response to deactivate said liquid feeding means.

2. The method called for in claim 1 wherein said liquid component is water and said solid component is starch.

3. The method called for in claim 1 wherein said first electrical response also activates agitator means within said relatively small container and said third electrical response deactivates said agitator means.

4. The method called for in claim 3 wherein said relatively small container rests on a scale and wherein said second electrical response is created when the combined weight of said liquid and solid increments reaches a predetermined value, wherein said third electrical response is created when the combined weight of said liquid and solid increments drops to zero, and wherein said fourth electrical response is created when said next relatively small increment of said liquid is completely introduced into said relatively small container.

5. A cyclic method of automatically maintaining in a relatively large container a relatively large supply of predetermined composition containing a liquid component and a solid ingredient, one cycle of which comprises, creating a first electrical response when said large supply falls below a predetermined level in said relatively large container, utilizing said first response to activate means for feeding a predetermined relatively small increment of said liquid into said relatively small container, creating a second electrical response when said predetermined increment of said liquid has been completely introduced into said relatively small container, utilizing said second electrical response to both deactivate said liquid feeding means and to activate means for feeding a predetermined relatively small increment of said solid ingredient into said relatively small container, creating a third electrical response when said predetermined increment of said solid material has been fed, utilizing said third electrical response to both deactivate said solid feeding means and to activate means for discharging said combined relatively small liquid and solid increments into said relatively large slurry supply, creating a fourth electrical response once said discharging is completed, utilizing said fourth response to close said discharging means.

6. Cyclically operating apparatus for automatically maintaining in a relatively large holding container a relatively large supply of a slurry of predetermined composition with respect to a liquid component and a solid component, which comprises: electric liquid level sensing and control means associated with said large holding container operable to electrically respond when said slurry falls below a predetermined level therein; a scale; a relatively small container resting on said scale; an electrically operated agitator within said small container; electrically operated solids feeding means arranged to discharge into said small container; electrically operated liquid feeding means arranged to discharge into said small container; electrically operated discharge means arranged to discharge the contents of said small container into said large container; said scale having associated therewith a first switch which is actuated when said small container contains full predetermined increments of said liquid and solid components, a second switch which is actuated when said small container is empty, and a third switch which is actuated when said container contains only a full increment of said liquid; first circuit means electrically interconnecting said electrical level sensing means, said solids feeding means and said agitator so as to actuate said solids feeding means and said agitator when the slurry level falls below said predetermined level within said large container; second circuit means electrically interconnecting said first switch, said solids feeding means, said agitator and said discharge means so as to deactivate said solids feeding means and said agitator and open said discharge means when said first switch is actuated; third circuit means electrically interconnecting said second switch, said discharge means and said liquid feeding means so as to close said discharge means and activate said liquid feeding means when the contents of said small container are emptied; and fourth circuit means electrically interconnecting said third switch and said liquid feeding means so as to deactivate the latter when said small container receives a full increment of liquid.

7. Cyclically operating apparatus for automatically maintaining in a relatively large holding container a relatively large supply of a slurry of predetermined composition with respect to a liquid component and a solid component, which comprises: liquid level sensing and control means associated with said large holding container operable to respond when said slurry falls below a predetermined level therein; a relatively small container; solids feeding means arranged to discharge into said small container; liquid feeding means arranged to discharge into said small container; discharge means arranged to discharge the contents of said small container into said large container; said small container having associated therewith a first control which is actuated when said small container contains full predetermined increments of said liquid and solid components, a second control which is actuated when said small container is empty, and a third control which is actuated when said container contains only a full increment of said liquid; means interconnecting said level sensing means, said solids feeding means to actuate said solids feeding means when the slurry level falls below said predetermined level within said large container; means interconnecting said first control, said solids feeding means and said discharge means so as to deactivate said solids feeding means and open said discharge means when said first control is actuated; means interconnecting said second control, said discharge means, and said liquid feeding means so as to close said discharge means and activate said liquid feeding means when the contents of said small container are emptied; and means interconnecting said third control and said liquid feeding means so as to deactivate the latter when said small container receives a full increment of liquid.

8. Cyclically operating apparatus for automatically maintaining in a relatively large holding container a relatively large supply of a slurry of predetermined composition with respect to a liquid component and a solid component, which comprises: liquid level sensing and control means associated with said large holding container operable to respond when said slurry falls below a predetermined level therein; a relatively small container; solids feeding means arranged to discharge into said small container; liquid feeding means arranged to discharge into said small container; discharge means arranged to discharge the contents of said small container into said large container; said small container having associated therewith a first control which is actuated when said small container contains full predetermined increments of said liquid and solid components, a second control which is actuated when said small container is empty, and a third control which is actuated when said container contains only a full increment of said liquid; means interconnecting said level sensing means, said liquid feeding means to actuate said liquid feeding means when the slurry falls below said predetermined level within said large container; means interconnecting said third control, said liquid feeding means and said solid feeding means so as to deactivate said liquid feeding means and to actuate said solid feeding means when said small container receives a full increment of liquid and said third control is actuated; means interconnecting said first control, said solids feeding means and said discharge means so as to deactivate said solids feeding means and open said discharge means when said first control is actuated; means interconnecting said second control and said discharge means so as to close said discharge means when the contents of said small container are emptied.

References Cited

UNITED STATES PATENTS

| | | | |
|---|---|---|---|
| 1,880,562 | 10/1932 | Weckerly | 177—123 X |
| 2,871,146 | 1/1959 | Etheridge | 127—28 |
| 2,975,038 | 3/1961 | Lott | 127—22 X |
| 3,102,603 | 9/1963 | Kerr | 177—123 |
| 3,224,738 | 12/1965 | Tarukawa | 295—154 X |

MORRIS O. WOLK, *Primary Examiner.*

S. MARANTZ, *Assistant Examiner.*

U.S. Cl. X.R.

177—122; 259—8, 154